US012798932B2

(12) United States Patent
Kishi

(10) Patent No.: US 12,798,932 B2
(45) Date of Patent: Nov. 17, 2026

(54) WINCH CONTROL DEVICE AND CRANE COMPRISING SAME

(71) Applicant: KOBELCO CONSTRUCTION MACHINERY CO., LTD., Hiroshima (JP)

(72) Inventor: Takuro Kishi, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 58 days.

(21) Appl. No.: 19/108,767

(22) PCT Filed: Aug. 31, 2023

(86) PCT No.: PCT/JP2023/031821
§ 371 (c)(1),
(2) Date: Mar. 5, 2025

(87) PCT Pub. No.: WO2024/057955
PCT Pub. Date: Mar. 21, 2024

(65) Prior Publication Data

US 2026/0084938 A1 Mar. 26, 2026

(30) Foreign Application Priority Data

Sep. 14, 2022 (JP) ................................ 2022-146265

(51) Int. Cl.
*B66D 1/48* (2006.01)
*B66D 1/08* (2006.01)
(Continued)

(52) U.S. Cl.
CPC ............... *B66D 1/485* (2013.01); *B66D 1/08* (2013.01); *B66D 1/16* (2013.01); *B66D 5/28* (2013.01); *B66D 2700/0183* (2013.01)

(58) Field of Classification Search
CPC . B66D 1/485; B66D 1/08; B66D 1/16; B66D 5/28; B66D 2700/0183
(Continued)

(56) References Cited

U.S. PATENT DOCUMENTS 4,223,871 A * 9/1980 Braithwaite ........... B66D 1/741 60/347
4,345,742 A * 8/1982 Morfitt ..................... B66D 1/44 254/315
(Continued)

FOREIGN PATENT DOCUMENTS

JP 2013-116813 A 6/2013
JP 2018- 043824 A 3/2018
JP 2019 -055880 A 4/2019

OTHER PUBLICATIONS

International Search Report issued on Nov. 7, 2023, in PCT/JP2023/031821 filed on Aug. 31, 2023, therein 2 pages.

*Primary Examiner* — Paul T Chin
(74) *Attorney, Agent, or Firm* — Oblon, McClelland, Maier & Neustadt, L.L.P.

(57) ABSTRACT

A controller of a winch control device performs: a first control for, when a winding operation is applied in a free mode, switching the mode of a brake device from the free mode to a coupled mode; a second control for, when a winch operating member is returned to a neutral position, switching the mode from the coupled mode to the free mode in a state where a command for adjusting the secondary pressure of a brake force regulator to a set pressure, which is larger than an operation amount corresponding pressure corresponding to the operation amount of a brake operation, is input into the brake force regulator; and a third control for inputting into the brake force regulator a command for
(Continued)

adjusting the secondary pressure of the brake force regulator to the operation amount corresponding pressure.

8 Claims, 11 Drawing Sheets

(51) Int. Cl.
*B66D 1/16* (2006.01)
*B66D 5/28* (2006.01)
(58) Field of Classification Search
USPC .......................................................... 254/264
See application file for complete search history.

(56) References Cited

U.S. PATENT DOCUMENTS

| | | | | | |
|---|---|---|---|---|---|
| 4,516,755 | A * | 5/1985 | Uchimura | B66D 1/44 | 477/69 |
| 6,164,627 | A * | 12/2000 | Ravellini | B66D 1/22 | 254/367 |
| 2005/0072965 | A1* | 4/2005 | Sanders | B66D 1/54 | 254/361 |
| 2020/0207596 | A1* | 7/2020 | Hausladen | B66D 5/18 | |

* cited by examiner

FIG.3

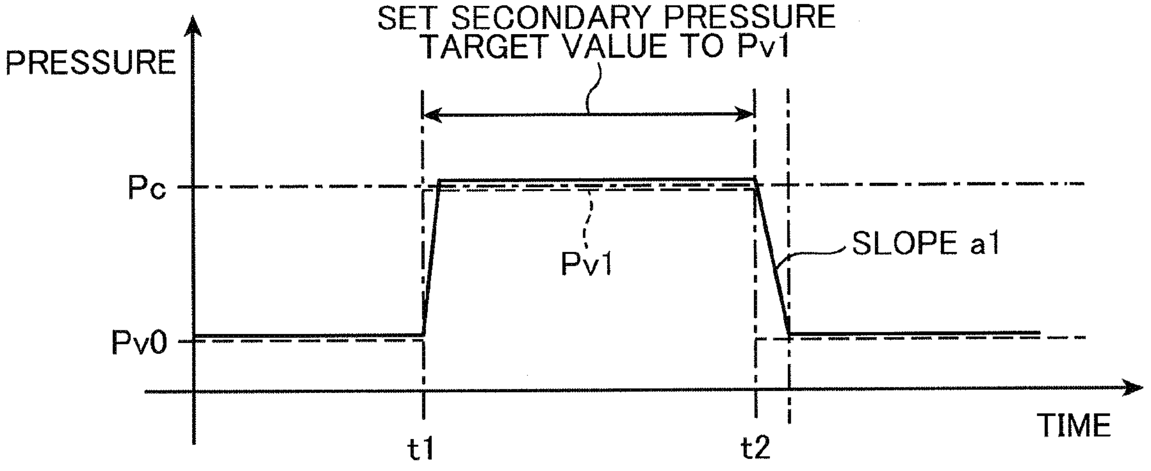

t1:TIME POINT TO START WINDING LEVER OPERATION, TIME POINT TO SWITCH TO COUPLED MODE t2:TIME POINT TO RETURN LEVER TO NEUTRAL POSITION, TIME POINT TO SWITCH TO FREE MODE

Pc:SECONDARY PRESSURE OF CONTROL PUMP

BROKEN LINE:SECONDARY PRESSURE TARGET VALUE OF ELECTROMAGNETIC PROPORTIONAL VALVE CORRESPONDING TO COMMAND OF CONTROLLER

Pv0:SECONDARY PRESSURE TARGET VALUE OF ELECTROMAGNETIC PROPORTIONAL VALVE CORRESPONDING TO PEDAL OPERATION AMOUNT

Pv1:SECONDARY PRESSURE TARGET VALUE OF ELECTROMAGNETIC PROPORTIONAL VALVE FOR UNDERSHOOT COUNTERMEASURE

SOLID LINE:PRESSURE IN CLUTCH CHAMBER

FIG.5

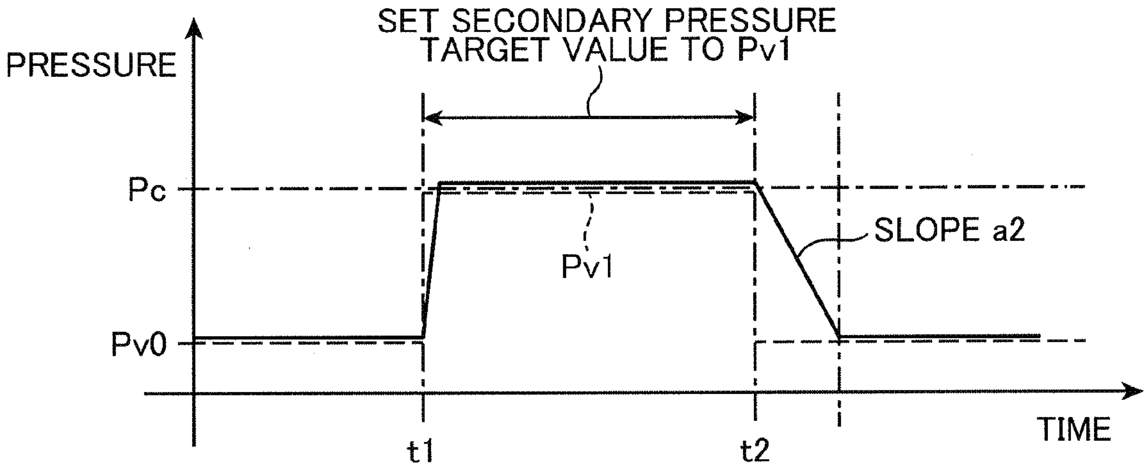

t1:TIME POINT TO START WINDING LEVER OPERATION, TIME POINT TO SWITCH TO COUPLED MODE t2:TIME POINT TO RETURN LEVER TO NEUTRAL POSITION, TIME POINT TO SWITCH TO FREE MODE

Pc:SECONDARY PRESSURE OF CONTROL PUMP

BROKEN LINE:SECONDARY PRESSURE TARGET VALUE OF ELECTROMAGNETIC PROPORTIONAL VALVE CORRESPONDING TO COMMAND OF CONTROLLER

Pv0:SECONDARY PRESSURE TARGET VALUE OF ELECTROMAGNETIC PROPORTIONAL VALVE CORRESPONDING TO PEDAL OPERATION AMOUNT

Pv1:SECONDARY PRESSURE TARGET VALUE OF ELECTROMAGNETIC PROPORTIONAL VALVE FOR UNDERSHOOT COUNTERMEASURE

SOLID LINE:PRESSURE IN CLUTCH CHAMBER

FIG.6

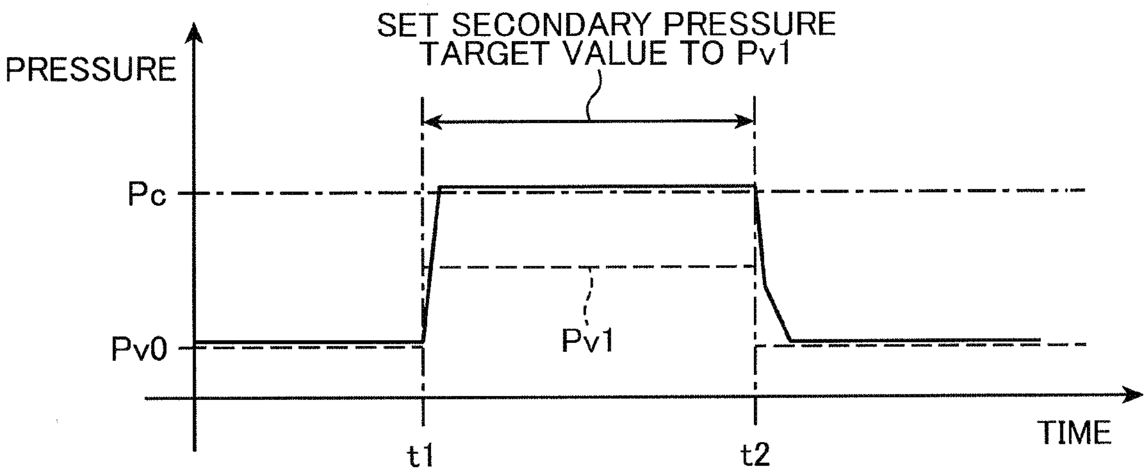

t1:TIME POINT TO START WINDING LEVER OPERATION, TIME POINT TO SWITCH TO COUPLED MODE t2:TIME POINT TO RETURN LEVER TO NEUTRAL POSITION, TIME POINT TO SWITCH TO FREE MODE

Pc:SECONDARY PRESSURE OF CONTROL PUMP

BROKEN LINE:SECONDARY PRESSURE TARGET VALUE OF ELECTROMAGNETIC PROPORTIONAL VALVE CORRESPONDING TO COMMAND OF CONTROLLER

Pv0:SECONDARY PRESSURE TARGET VALUE OF ELECTROMAGNETIC PROPORTIONAL VALVE CORRESPONDING TO PEDAL OPERATION AMOUNT

Pv1:SECONDARY PRESSURE TARGET VALUE OF ELECTROMAGNETIC PROPORTIONAL VALVE FOR UNDERSHOOT COUNTERMEASURE

SOLID LINE:PRESSURE IN CLUTCH CHAMBER

FIG.7

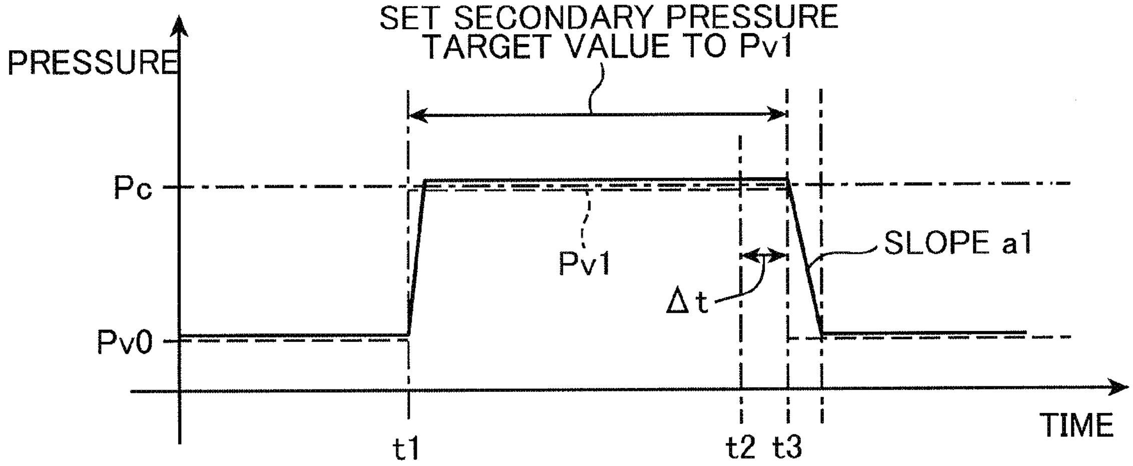

t1:TIME POINT TO START WINDING LEVER OPERATION,
TIME POINT TO SWITCH TO COUPLED MODE t2:TIME POINT TO RETURN LEVER TO NEUTRAL POSITION,
TIME POINT TO SWITCH TO FREE MODE t3: TIME POINT TO SWITCH MODE SWITCHING VALVE

Δt: WAITING TIME (t3−t2)

Pc:SECONDARY PRESSURE OF CONTROL PUMP

BROKEN LINE:SECONDARY PRESSURE TARGET VALUE OF ELECTROMAGNETIC PROPORTIONAL VALVE CORRESPONDING TO COMMAND OF CONTROLLER

Pv0:SECONDARY PRESSURE TARGET VALUE OF ELECTROMAGNETIC PROPORTIONAL VALVE CORRESPONDING TO PEDAL OPERATION AMOUNT

Pv1:SECONDARY PRESSURE TARGET VALUE OF ELECTROMAGNETIC PROPORTIONAL VALVE FOR UNDERSHOOT COUNTERMEASURE

SOLID LINE:PRESSURE IN CLUTCH CHAMBER

FIG.9

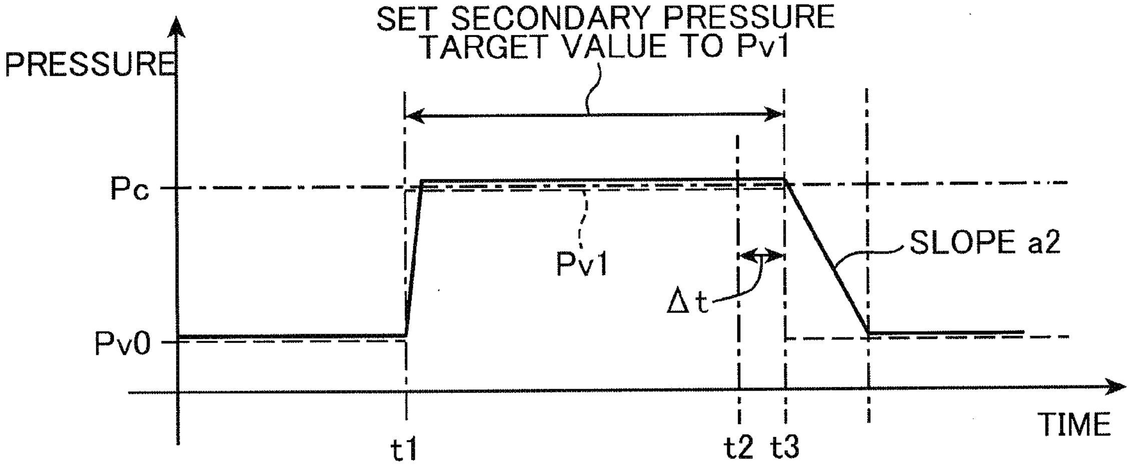

t1:TIME POINT TO START WINDING LEVER OPERATION, TIME POINT TO SWITCH TO COUPLED MODE t2:TIME POINT TO RETURN LEVER TO NEUTRAL POSITION, TIME POINT TO SWITCH TO FREE MODE t3: TIME POINT TO SWITCH MODE SWITCHING VALVE

Δt: WAITING TIME (t3−t2)

Pc:SECONDARY PRESSURE OF CONTROL PUMP

BROKEN LINE:SECONDARY PRESSURE TARGET VALUE OF ELECTROMAGNETIC PROPORTIONAL VALVE CORRESPONDING TO COMMAND OF CONTROLLER

Pv0:SECONDARY PRESSURE TARGET VALUE OF ELECTROMAGNETIC PROPORTIONAL VALVE CORRESPONDING TO PEDAL OPERATION AMOUNT

Pv1:SECONDARY PRESSURE TARGET VALUE OF ELECTROMAGNETIC PROPORTIONAL VALVE FOR UNDERSHOOT COUNTERMEASURE

SOLID LINE:PRESSURE IN CLUTCH CHAMBER

FIG.10

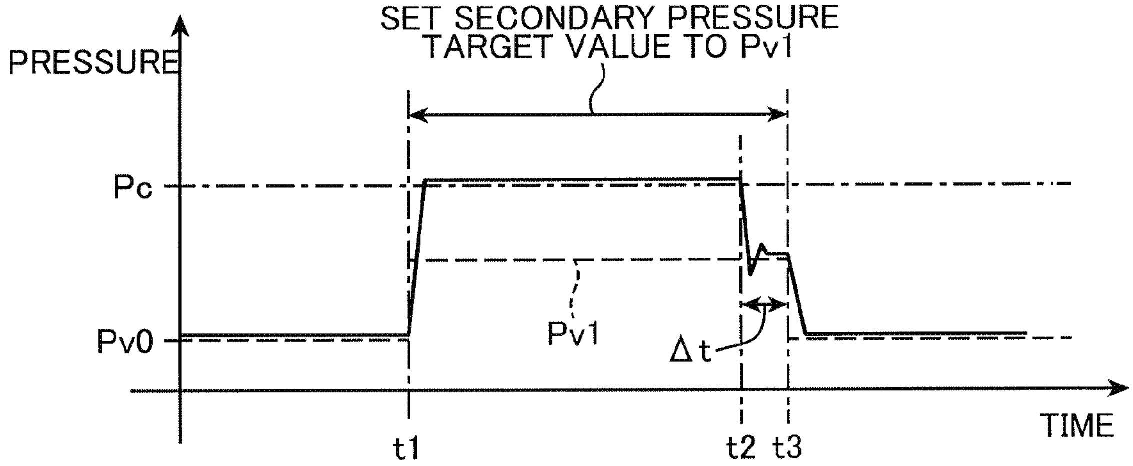

t1:TIME POINT TO START WINDING LEVER OPERATION, TIME POINT TO SWITCH TO COUPLED MODE t2:TIME POINT TO RETURN LEVER TO NEUTRAL POSITION, TIME POINT TO SWITCH TO FREE MODE t3: TIME POINT TO SWITCH MODE SWITCHING VALVE

Δt: WAITING TIME (t3-t2)

Pc:SECONDARY PRESSURE OF CONTROL PUMP

BROKEN LINE:SECONDARY PRESSURE TARGET VALUE OF ELECTROMAGNETIC PROPORTIONAL VALVE CORRESPONDING TO COMMAND OF CONTROLLER

Pv0:SECONDARY PRESSURE TARGET VALUE OF ELECTROMAGNETIC PROPORTIONAL VALVE CORRESPONDING TO PEDAL OPERATION AMOUNT

Pv1:SECONDARY PRESSURE TARGET VALUE OF ELECTROMAGNETIC PROPORTIONAL VALVE FOR UNDERSHOOT COUNTERMEASURE

SOLID LINE:PRESSURE IN CLUTCH CHAMBER

FIG.11

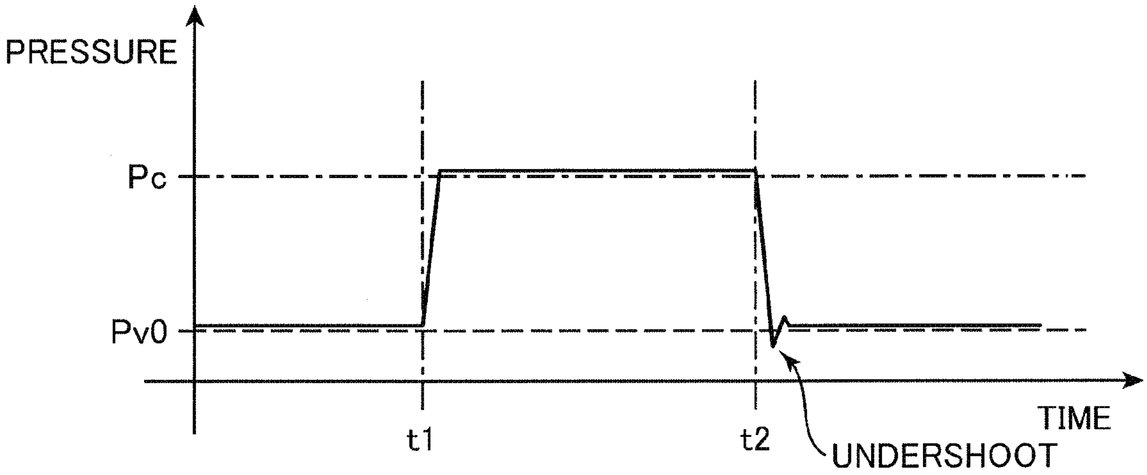

t1:TIME POINT TO START WINDING LEVER OPERATION, TIME POINT TO SWITCH TO COUPLED MODE t2:TIME POINT TO RETURN LEVER TO NEUTRAL POSITION, TIME POINT TO SWITCH TO FREE MODE

Pc:SECONDARY PRESSURE OF CONTROL PUMP

BROKEN LINE:SECONDARY PRESSURE TARGET VALUE OF ELECTROMAGNETIC PROPORTIONAL VALVE CORRESPONDING TO COMMAND OF CONTROLLER

Pv0:SECONDARY PRESSURE TARGET VALUE OF ELECTROMAGNETIC PROPORTIONAL VALVE CORRESPONDING TO PEDAL OPERATION AMOUNT

SOLID LINE:PRESSURE IN CLUTCH CHAMBER

WINCH CONTROL DEVICE AND CRANE COMPRISING SAME

TECHNICAL FIELD

The present disclosure relates to a winch control device and a crane including the winch control device.

BACKGROUND ART

In general, a crane includes a lower body, an upper slewing body rotatably supported by the lower body, a work device including a boom attached to the upper slewing body, a hook suspended from the head of the work device via a rope, and a winch drum around which the rope is wound. Such a crane includes a winch control device that controls winding of the rope around the winch drum and unwinding of the rope from the winch drum (for example, Patent Literature 1).

The winch control device includes a winch motor that drives a winch drum, a brake device (clutch), and a mode switching valve (state switching valve). The brake device adjusts a coupled state (degree of coupling) between the winch motor and the winch drum. The mode switching valve switches the mode of the brake device between a coupled mode in which the drive force of the winch motor is capable of being transmitted to the winch drum and a free mode in which the rope is capable of being unwound from the winch drum by the tension of the rope. In the coupled mode, winding of the rope around the winch drum or unwinding of the rope from the winch drum is performed by the drive force of the winch motor. In the free mode, the degree of the coupling changes according to the operation amount of the brake operation applied to a brake operating pedal, which causes the brake force on the rotation of the winch drum to have a magnitude according to the operation amount of the brake operation. In the free mode, when the operation amount of the brake operation is zero or small, the hook (or the hook and a suspended load) is allowed to freely fall with the weight of the hook (or the weight of the hook and the suspended load).

The work of operating the crane includes, for example, a suspended load work of lifting and lowering a suspended load suspended from the hook by winding or unwinding the rope around the winch drum, a moving work of moving the suspended load suspended from the hook, and the like. In the work of operating the crane, an operator performs a mode switching operation for switching the mode of the brake device to the coupled mode or the free mode according to the work content.

It is preferable that the mode of the brake device as described above is automatically switched by a controller because the operator does not need to perform a complicated mode switching operation. Specifically, it is preferable that the controller is configured to automatically switch the mode of the brake device from the free mode to the coupled mode when the operator applies a winding operation to a winch operating lever with the mode of the brake device being set to the free mode, and the controller is configured to automatically return the mode of the brake device from the coupled mode to the free mode when the winding operation has ended and the operator returns the operating lever to a neutral position.

However, in a case where the brake operating device adopts a so-called electric pedal system, when the controller automatically returns the mode of the brake device from the coupled mode to the free mode, there is a problem that the actual brake force on the winch drum becomes instantaneously smaller than the brake force corresponding to the operation amount of the brake operation.

CITATION LIST

Patent Literature

Patent Literature 1: JP 2019-055880 A

SUMMARY OF INVENTION

An object of the present disclosure is to provide a winch control device capable of inhibiting the actual brake force on a winch drum from becoming instantaneously smaller than the brake force corresponding to the operation amount of a brake operation when a controller automatically returns the mode of the brake device from the coupled mode to the free mode, and a crane including the winch control device.

A winch control device to be provided includes a winch drum around which a rope is wound, a winch motor that drives the winch drum, a winch operating member to which a winding operation for rotating the winch drum in a rope winding direction is applied, a brake operating member to which a brake operation is applied, a brake device capable of generating a brake force on the winch drum, a mode switching valve that switches a mode of the brake device between a coupled mode in which a drive force of the winch motor is capable of being transmitted to the winch drum and a free mode in which the rope is capable of being unwound from the winch drum by a tension of the rope, a brake force regulator that outputs a secondary pressure for adjusting the brake force in the free mode, and a controller, wherein the controller performs a first control of switching the mode of the brake device from the free mode to the coupled mode by controlling the mode switching valve when the winding operation is applied to the winch operating member in the free mode, a second control of switching the mode of the brake device from the coupled mode to the free mode by controlling the mode switching valve in a state where a set pressure command for adjusting the secondary pressure of the brake force regulator to a set pressure that is a value larger than an operation amount corresponding pressure corresponding to an operation amount of the brake operation is input to the brake force regulator when the winch operating member is returned to a neutral position after the first control, and a third control of inputting a corresponding pressure command for adjusting the secondary pressure of the brake force regulator to the operation amount corresponding pressure to the brake force regulator after the second control.

BRIEF DESCRIPTION OF DRAWINGS

FIG. 3 is a graph illustrating undershoot suppression control performed by the controller.

FIG. 5 is a graph illustrating a first modification of the undershoot suppression control performed by the controller.

FIG. 6 is a graph illustrating a second modification of the undershoot suppression control performed by the controller.

FIG. 7 is a graph illustrating a third modification of the undershoot suppression control performed by the controller.

FIG. 9 is a graph illustrating a fourth modification of the undershoot suppression control performed by the controller.

FIG. 10 is a graph illustrating a fifth modification of the undershoot suppression control performed by the controller.

FIG. 11 is a graph illustrating an example of control performed by a controller according to a reference example.

DESCRIPTION OF EMBODIMENT

Hereinafter, embodiments of the present disclosure will be described in detail with reference to the drawings.

Figure 1:
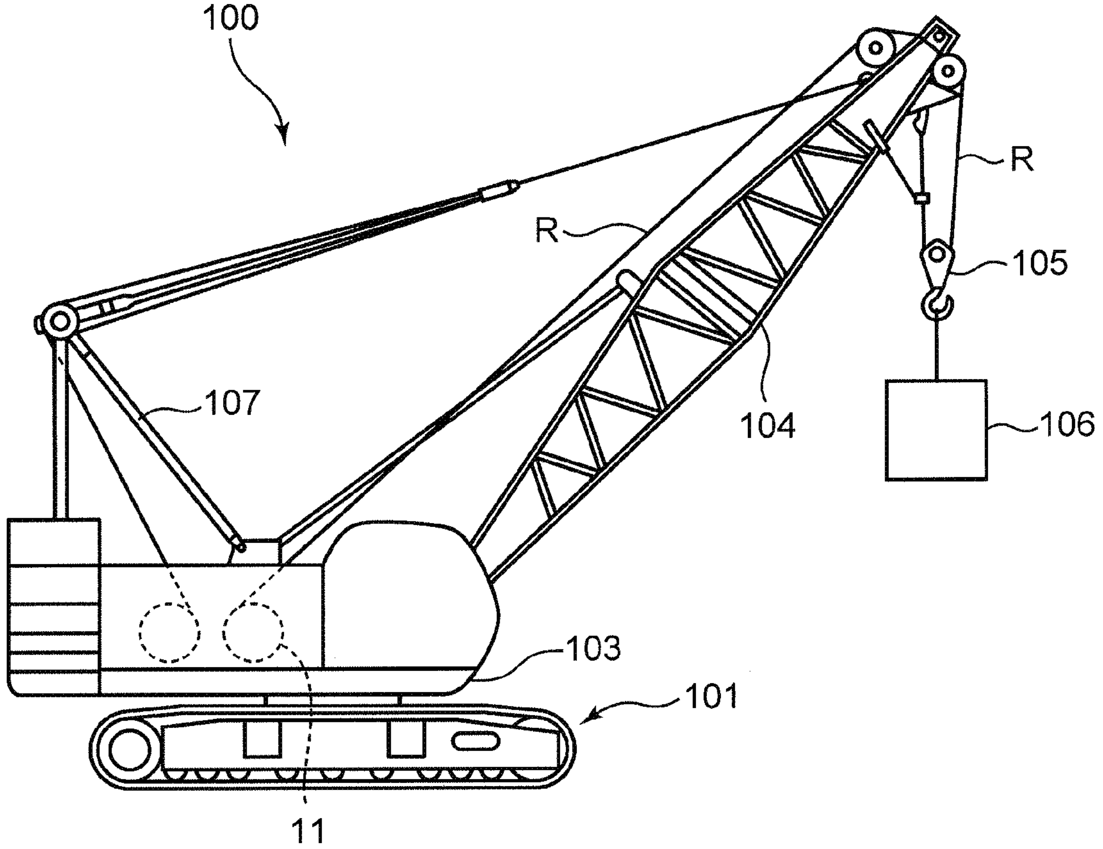
FIG. 1 is a side view illustrating a crane including a winch control device according to an embodiment of the present disclosure.

FIG. 1 is a side view illustrating a crane 100 according to an embodiment of the present disclosure. As illustrated in FIG. 1, the crane 100 includes a lower travelling body 101 capable of self-propelling, an upper slewing body 103 supported on the lower travelling body 101 so as to be slewable about an axis, a work device attached to the upper slewing body 103, a hook 105 suspended from a head of the work device via a rope R, a gantry 107 attached to the upper slewing body 103, and a winch drum 11. The upper slewing body 103 is one example of a machine body. In the crane 100 illustrated in FIG. 1, the work device is constituted by a boom 104, but the work device may include the boom 104 and a jib (not illustrated) attached to the head of the boom 104. The crane 100 may include a mast (not illustrated) instead of the gantry 107.

The rope R leading to the hook 105 is wound around the winch drum 11. The rope R is unwound from the winch drum 11, passes through the head of the work device, and is disposed to hang down from the head of the work device to support the hook 105. A suspended load 106 is suspended from the hook 105. The winch drum 11 rotates in a rope winding direction to wind the rope R, and rotates in a rope unwinding direction to unwind the rope R. The winch drum 11 winds or unwinds the rope R to perform a suspended load work of lifting and lowering the suspended load 106 suspended from the hook 105. The winch drum 11 is disposed such that its rotation axis matches a width direction of the upper slewing body 103. In the present embodiment, the winch drum 11 is supported by the upper slewing body 103, but it may be supported by the boom 104.

Figure 2:
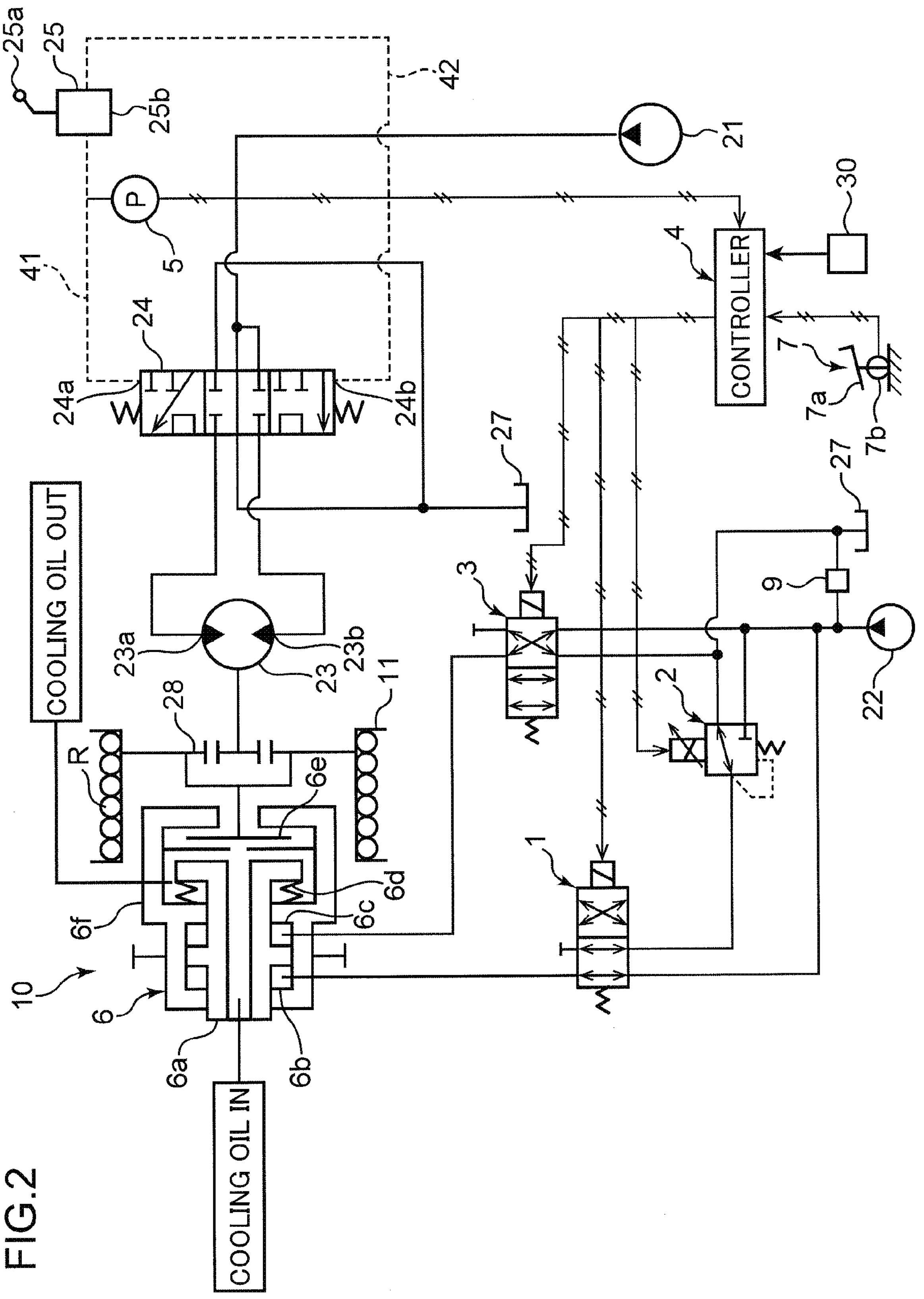
FIG. 2 is a diagram illustrating a hydraulic circuit and a controller of the winch control device.

As illustrated in FIG. 2, the crane 100 further includes a main pump 21, a winch motor 23, a winch control valve 24, a winch operating device 25, and a speed reducer 28.

The main pump 21 is driven by, for example, a drive source (not illustrated) such as an engine to discharge hydraulic oil.

The winch motor 23 is a hydraulic motor for rotationally driving the winch drum 11. The winch motor 23 receives supply of hydraulic oil from the main pump 21 and rotates. Specifically, the winch motor 23 includes a winding port 23*a* and an unwinding port 23*b*. The winch motor operates to receive the supply of hydraulic oil to one of the ports to rotate in a direction corresponding to the one port and discharge the hydraulic oil from the other port.

The winch control valve 24 is interposed between the main pump 21 and the winch motor 23, selectively guides hydraulic oil for driving the winch motor 23 from the main pump 21 to one of the winding port 23*a* and the unwinding port 23*b* of the winch motor 23, controls the direction of the hydraulic oil to be supplied to the winch motor 23, and controls the flow amount of the hydraulic oil to be supplied to the winch motor 23. The winch control valve 24 includes a winding pilot port 24*a* and an unwinding pilot port 24*b*.

The winch operating device 25 includes a winch operating lever 25*a* and a remote control valve 25*b*. The winch operating lever 25*a* rotates in a direction corresponding to the winch operation applied to the winch operating lever 25*a* by the operator. The winch operation includes a winding operation and an unwinding operation. The winding operation is an operation for rotating the winch drum 11 in the rope winding direction, that is, an operation for winding the rope R around the winch drum 11. The unwinding operation is an operation for rotating the winch drum 11 in the rope unwinding direction, that is, an operation for unwinding the rope R from the winch drum 11. The winch operating lever 25*a* is an example of a winch operating member.

The remote control valve 25*b* includes an inlet port connected to a pilot pump (not illustrated) and a pair of outlet ports. One outlet port is connected to the winding pilot port 24*a* of the winch control valve 24 via a pilot line 41. The other outlet port is connected to the unwinding pilot port 24*b* of the winch control valve 24 via a pilot line 42. The remote control valve 25*b* inputs a secondary pressure (pilot pressure) corresponding to the magnitude of the winch operation applied to the winch operating lever 25*a* to the pilot port corresponding to the direction of the winch operation among the winding pilot port 24*a* and the unwinding pilot port 24*b*. The pilot pump may be a control pump 22 described later, or may be a pump different from the control pump 22.

The winch control valve 24 is held at a neutral position (center position in FIG. 2) when the pilot pressure is not input to the winding pilot port 24*a* or the unwinding pilot port 24*b*. At this neutral position, the main pump 21 and the winch motor 23 are disconnected to open a center bypass line, and thus the hydraulic oil from the main pump 21 directly returns to the tank 27 through the center bypass line.

When a pilot pressure of a certain level or more is input to the winding pilot port 24*a*, the winch control valve 24 shifts from the neutral position to a winding drive position (upper position in FIG. 2) with a stroke corresponding to the magnitude of the pilot pressure. At this winding drive position, the hydraulic oil from the main pump 21 is supplied to the winding port 23*a* of the winch motor 23 at a flow amount corresponding to the stroke, and the hydraulic oil is discharged from the unwinding port 23*b*. This rotates the winch motor 23 in a winding direction. The discharged hydraulic oil returns to the tank 27. In a coupled mode described later, when the winch motor 23 rotates in the winding direction, the winch drum 11 rotates in the rope winding direction.

When a pilot pressure of a certain level or more is input to the unwinding pilot port 24*b*, the winch control valve 24 shifts from the neutral position to an unwinding drive position (lower position in FIG. 2) with a stroke corresponding to the magnitude of the pilot pressure. At this unwinding drive position, the hydraulic oil from the main pump 21 is supplied to the unwinding port 23*b* of the winch motor 23 at a flow amount corresponding to the stroke, and the hydraulic oil is discharged from the winding port 23*a*. This rotates the winch motor 23 in a unwinding direction. The discharged hydraulic oil returns to the tank 27. In the coupled mode described later, when the winch motor 23 rotates in the unwinding direction, the winch drum 11 rotates in the rope unwinding direction.

The speed reducer 28 is interposed between the winch motor 23 and the winch drum 11, and it transmits the drive force of the winch motor 23 to the winch drum 11 while reducing the rotational speed. The speed reducer 28 includes, for example, a planetary gear mechanism. A plate 6_e_ in a brake device 6 described later is connected to a carrier shaft of the speed reducer 28.

As illustrated in FIG. 2, the crane 100 further includes a control pump 22, a brake device 6 (clutch device), a brake operating device 7, a mode switching valve 1, an electromagnetic proportional valve 2 (electromagnetic proportional pressure reducing valve), an emergency brake switching valve 3, a pressure sensor 5, a relief valve 9, and a controller 4.

The control pump 22 is driven by the drive source such as an engine to discharge hydraulic oil.

The brake device 6 is configured to be able to generate a brake force on the winch drum 11. Specifically, the brake device 6 is configured to be able to generate a brake force on the winch drum 11 using the pressure of the hydraulic oil discharged from the control pump 22.

The brake device 6 is configured to be switchable between a clutch-on state in which the drive force of the winch motor 23 is transmitted to the winch drum 11 and a clutch-off state in which the winch drum 11 is separated from the winch motor 23 to allow free rotation of the winch drum 11. The mode of the brake device 6 can be switched between a coupled mode in which the drive force of the winch motor 23 is capable of being transmitted to the winch drum 11 and a free mode in which the rope R is capable of being unwound from the winch drum 11 by the tension of the rope R.

The brake device 6 includes a piston 6_a_, a spring 6_d_, a plurality of plates 6_e_, and a unit case 6_f_ that accommodates the piston 6_a_, the spring 6_d_, and the plurality of plates 6_e_. The plurality of plates 6_e_ are, for example, a plurality of friction plates (a plurality of brake disks) immersed in cooling oil. The inside of the unit case 6_f_ is partitioned into a positive clutch chamber 6_b_, a negative clutch chamber 6_c_, and a plate chamber in which the plurality of plates 6_e_ are disposed. The piston 6_a_ can be displaced with respect to the unit case 6_f_ in its axial direction. The axial direction is a direction in which the piston 6_a_ approaches the plurality of plates 6_e_ or a direction in which the piston 6_a_ moves away from the plurality of plates 6_e_.

When the piston 6_a_ moves in the axial direction, the state of the brake device 6 is switched between the clutch-on state (a state in which the brake is applied) and the clutch-off state (a state in which the brake is released).

Specifically, the piston 6_a_ moves in the direction of approaching the plurality of plates 6_e_ to apply pressing force to the plurality of plates 6_e_ such that adjacent plates 6_e_ come into contact with each other. As a result, the state of the brake device 6 becomes the clutch-on state, that is, the mode of the brake device 6 becomes the coupled mode. On the other hand, when the piston 6_a_ moves in the direction away from the plurality of plates 6_e_, adjacent plates 6_e_ separate from each other. As a result, the state of the brake device 6 becomes the clutch-off state. The spring 6_d_ biases the piston 6_a_ in a direction in which the state of the brake device 6 becomes the clutch-on state, that is, in a direction in which the piston 6_a_ approaches the plurality of plates 6_e_.

In the present embodiment, when the pressure in the positive clutch chamber 6_b_ and the pressure in the negative clutch chamber 6_c_ are the same, the state of the brake device 6 becomes the clutch-on state with the biasing force of the spring 6_d_. On the other hand, when the pressure in the negative clutch chamber 6_c_ is larger than the pressure in the positive clutch chamber 6_b_, and the force generated by the differential pressure (that is, the force in the direction of moving the piston 6_a_ away from the plurality of plates 6_e_) is larger than the biasing force of the spring 6_d_, the state of the brake device 6 becomes the clutch-off state.

As illustrated in FIG. 2, the brake device 6 is configured such that cooling oil is supplied to the plate chamber to prevent seizure of the plates 6_e_ due to friction generated between adjacent plates 6_e_.

The brake operating device 7 is an operating device adopting a so-called electric pedal system. The brake operating device 7 of an electric pedal system includes a brake operating pedal 7_a_ (foot pedal) and an operation amount sensor 7_b_. The brake operating pedal 7_a_ is applied with a brake operation for adjusting a brake force on the winch drum 11 by the operator. When the brake operation (pedal operation) is applied by the operator to the brake operating pedal 7_a_, the operation amount sensor 7_b_ detects the operation amount of the pedal operation, and inputs a brake detection signal, which is a detection signal corresponding to the detected operation amount, to the controller 4. The brake operating pedal 7_a_ is an example of a brake operating member.

The mode switching valve 1 is interposed between the control pump 22 and the brake device 6. The mode switching valve 1 is a switching valve for switching the mode of the brake device 6 between the coupled mode and the free mode. In other words, the mode switching valve 1 is a switching valve for setting the mode of the brake device 6 to either the coupled mode or the free mode. For example, when a coupled mode switching command is input from the controller 4, the mode switching valve 1 may operate such that the mode of the brake device 6 is switched from the free mode to the coupled mode. For example, when a free mode switching command is input from the controller 4, the mode switching valve 1 may operate such that the mode of the brake device 6 is switched from the coupled mode to the free mode.

Specifically, in the present embodiment, as illustrated in FIG. 2, the mode switching valve 1 is switched between a first state (right position in FIG. 2) in which the control pump 22 and the brake device 6 are connected via the electromagnetic proportional valve 2, and a second state (left position in FIG. 2) in which the control pump 22 and the brake device 6 are connected while bypassing the electromagnetic proportional valve 2 (not via the electromagnetic proportional valve 2). When the mode switching valve 1 is in the first state, the control pump 22, the electromagnetic proportional valve 2, the mode switching valve 1, and the brake device 6 are connected in this order. When the mode switching valve 1 is in the second state, the control pump 22, the mode switching valve 1, and the brake device 6 are connected in this order. When the mode switching valve 1 is in the second state, the electromagnetic proportional valve 2 is not interposed between the control pump 22 and the mode switching valve 1.

The mode switching valve 1 may be an electromagnetic switching valve capable of switching between the first state and the second state according to the coupled mode switching command or the free mode switching command from the controller 4. Specifically, in the present embodiment, when the solenoid of the mode switching valve 1 is in a non-excited state, the state of the mode switching valve 1 is the second state (left position in FIG. 2), and when the solenoid of the mode switching valve 1 is in an excited state, the state of the mode switching valve 1 is the first state (right position in FIG. 2).

When the state of the mode switching valve 1 is the first state, that is, when the mode of the brake device 6 is the free mode, the electromagnetic proportional valve 2 outputs the secondary pressure for adjusting the brake force on the winch drum 11 according to a command from the controller 4. The secondary pressure output from the electromagnetic proportional valve 2 is supplied to the positive clutch chamber 6*b* of the brake device 6 via the mode switching valve 1, which adjusts the brake force on the winch drum 11. Specifically, in normal control other than undershoot suppression control described later, when the mode of the brake device 6 is the free mode, the controller 4 inputs a corresponding pressure command, which is a brake command corresponding to the operation amount of the brake operation (pedal operation), to the electromagnetic proportional valve 2, and the electromagnetic proportional valve 2 outputs a secondary pressure corresponding to the corresponding pressure command, that is, an operation amount corresponding pressure corresponding to the operation amount of the brake operation. In the undershoot suppression control, the controller 4 outputs a command (a set pressure command described later) different from the normal control to the electromagnetic proportional valve 2. Details of the undershoot suppression control will be described later. The electromagnetic proportional valve 2 is an example of a brake force regulator in the present disclosure.

The emergency brake switching valve 3 is configured to be switchable between a supply position (right position in FIG. 2) allowing the hydraulic oil from the control pump 22 to be supplied to the negative clutch chamber 6*c* and a discharge position (left position in FIG. 2) allowing the hydraulic oil in the negative clutch chamber 6*c* to be discharged from the negative clutch chamber 6*c* to the tank 27. In the present embodiment, the emergency brake switching valve 3 is configured by an electromagnetic valve (electromagnetic switching valve). In the present embodiment, the solenoid of the emergency brake switching valve 3 is normally in an excited state as illustrated in FIG. 2, and the spool of the emergency brake switching valve 3 is set at the supply position. When the mode switching valve 1 is in the first state (the solenoid is in the excited state), and a failure such as disconnection has occurred to decrease the secondary pressure of the electromagnetic proportional valve 2, the controller 4 switches the emergency brake switching valve 3 to the non-excited state. With this operation, the spool of the emergency brake switching valve 3 is switched from the supply position to the discharge position, and the negative clutch chamber 6*c* is connected to the tank 27. As a result, a brake force is generated on the winch drum 11, that is, the brake is applied on the winch drum 11.

When the mode switching valve 1 is in the second state (the solenoid is in the non-excited state), the pressure corresponding to the pump pressure, which is the discharge pressure of the control pump 22, is supplied to both the positive clutch chamber 6*b* and the negative clutch chamber 6*c*, and thus the state of the brake device 6 becomes the clutch-on state with the biasing force of the spring 6*d*, and the mode of the brake device 6 becomes the coupled mode. In this coupled mode, the brake force on the winch drum 11 is constantly generated, that is, the brake is applied to the winch drum 11 (clutch-on state). In this clutch-on state, the drive force of the winch motor 23 is transmitted to the winch drum 11. Thus, the winch drum 11 is rotated by the drive force of the winch motor 23 according to the winch operation (winding operation or unwinding operation) applied to the winch operating lever 25*a* by the operator, and the winding or unwinding of the rope R is performed.

When the state of the mode switching valve 1 is the first state (the solenoid is in the excited state), the mode of the brake device 6 becomes the free mode. In this free mode, the secondary pressure of the electromagnetic proportional valve 2 is applied to the positive clutch chamber 6*b*. In this free mode, the balance between the pressure in the positive clutch chamber 6*b* and the pressure in the negative clutch chamber 6*c* changes according to the secondary pressure of the electromagnetic proportional valve 2, and the piston 6*a* is displaced with respect to the unit case 6*f* in the axial direction thereof. In normal control other than the undershoot suppression control, when a brake detection signal corresponding to the operation amount of the brake operation is input from the operation amount sensor 7*b* to the controller 4, the controller 4 outputs a brake command corresponding to the brake detection signal to the electromagnetic proportional valve 2, and the electromagnetic proportional valve 2 outputs a secondary pressure corresponding to the brake command input from the controller 4. That is, the electromagnetic proportional valve 2 outputs the secondary pressure according to the operation amount of the brake operation. Specifically, the electromagnetic proportional valve 2 outputs a larger secondary pressure as the operation amount of the brake operation increases. When the output (secondary pressure) of the electromagnetic proportional valve 2 increases, the brake force on the winch drum 11 also increases, and the brake is applied on the winch drum 11. When the output (secondary pressure) of the electromagnetic proportional valve 2 decreases, the brake force on the winch drum 11 also decreases, and the brake on the winch drum 11 is released. Thus, in the free mode, the operator can switch between the state in which the brake is applied to the winch drum 11 and the state in which the brake is released by adjusting the operation amount of the brake operation. In a state where the brake is released in the free mode, the suspended load 106 can freely fall with its own weight. The speed of the free fall can be increased or decreased according to the operation amount of the brake operating pedal 7*a*.

The crane 100 may further include a mode selection switch 30. The mode selection switch 30 is an input device for the operator to manually switch the mode of the brake device 6 between the coupled mode and the free mode. The mode selection switch 30 is provided, for example, in a cab of the crane so that the operator can operate the switch. Upon receiving a free mode operation from the operator, the mode selection switch 30 inputs a free mode signal to the controller 4, and the controller 4 controls the operation of the mode switching valve 1 so that the state of the mode switching valve 1 becomes the first state (right position in FIG. 2). As a result, the mode of the brake device 6 is switched to the free mode. On the other hand, upon receiving a coupled mode operation from the operator, the mode selection switch 30 inputs a coupled mode signal to the controller 4, and the controller 4 controls the operation of the mode switching valve 1 so that the state of the mode switching valve 1 becomes the second state (left position in FIG. 2). As a result, the mode of the brake device 6 is switched to the coupled mode. In a predetermined case where the undershoot suppression control described later is performed, the mode of the brake device 6 is automatically switched by the controller 4.

The pressure sensor 5 is an example of a winding operation detector that detects whether a winding operation is applied to the winch operating device 25. In the present embodiment, the pressure sensor 5 is a pressure sensor that detects the secondary pressure of the remote control valve 25*b*. Specifically, the pressure sensor 5 detects the pressure of the pilot line 41 connecting the remote control valve 25*b* and the winding pilot port 24*a* of the winch control valve 24.

The pressure sensor 5 inputs a pressure detection signal, which is a detection signal corresponding to the detected pressure, to the controller 4, and the controller 4 can determine whether the winding operation is applied to the winch operating device 25 based on the pressure detection signal.

When the pressure of a discharge line (discharge line into which hydraulic oil is discharged from the control pump 22) connected to the control pump 22 exceeds a predetermined value, the relief valve 9 opens so as to flow at least a part of the hydraulic oil to the tank 27.

The controller 4 includes a computer including an arithmetic processing unit such as a CPU and an MPU, and a memory.

The crane 100 includes a winch control device 10 according to the present embodiment illustrated in FIG. 2. The winch control device 10 includes the winch drum 11, the winch motor 23, the winch operating device 25, the brake operating device 7, the brake device 6, the mode switching valve 1, the electromagnetic proportional valve 2, the main pump 21, the control pump 22, the pressure sensor 5, and the controller 4. The computer of the controller 4 executes a program stored in advance in the memory to perform the undershoot suppression control described later to solve the problem shown below.

A problem to be solved by the winch control device 10 according to the present embodiment will be described with reference to FIG. 11. A problem to be solved by the winch control device 10 is that the actual brake force on the winch drum 11 becomes instantaneously smaller than the brake force corresponding to the operation amount of the brake operation when the controller 4 automatically returns the mode of the brake device 6 from the coupled mode to the free mode, in a case where the brake operating device 7 adopts a so-called electric pedal system. Specifically, the problem is as follows.

In the electric pedal system, the operation amount sensor **7*b* of the brake operating device 7 inputs a detection signal corresponding to the detected operation amount to the controller 4, the controller 4 inputs a brake command corresponding to the input detection signal to the electromagnetic proportional valve 2, and the electromagnetic proportional valve 2 outputs a secondary pressure (pilot pressure) for adjusting the brake force on the rotation of the winch drum 11 to a magnitude corresponding to the brake command. This causes the brake force on the rotation of the winch drum 11** to have a magnitude corresponding to the operation amount of the brake operation.

In the winch control device 10 including the brake operating device 7 of the electric pedal system, the mode of the brake device 6 is automatically switched by the controller 4 in the following cases. In the graph of FIG. 11, the mode of the brake device 6 is set to the free mode in the time zone up to time t1. In this free mode, the controller 4 inputs, to the electromagnetic proportional valve 2, the corresponding pressure command, which is a brake command for adjusting the secondary pressure of the electromagnetic proportional valve 2 to an operation amount corresponding pressure Pv0, the operation amount corresponding pressure Pv0 being a value corresponding to the operation amount (pedal operation amount) of the brake operation applied to the brake operating pedal **7*a*. With this operation, in the time zone up to time t1 in the graph of FIG. 11, the electromagnetic proportional valve 2 outputs the secondary pressure according to the corresponding pressure command, that is, the operation amount corresponding pressure Pv0 according to the operation amount of the brake operation, and as a result, the pressure in the positive clutch chamber 6*b* of the brake device 6 is adjusted to the operation amount corresponding pressure Pv0 as indicated by the solid line in FIG. 11**.

When the mode of the brake device 6 is set to the free mode, and the operator applies the winding operation to the winch operating lever **25*a* at time 11 in FIG. 11, the controller 4 automatically switches the mode of the brake device 6 from the free mode to the coupled mode. With this operation, since the control pump 22 is connected to the positive clutch chamber 6*b* of the brake device 6 without passing through the electromagnetic proportional valve 2, the pressure in the positive clutch chamber 6*b* is adjusted to a pump pressure Pc which is the secondary pressure of the control pump 22 as indicated by the solid line in FIG. 11 in the time zone from time t1 to time t2 in FIG. 11**.

In the time zone from time t1 to time t2 in the graph of FIG. 11, that is, while the operator is applying the winding operation to the winch operating lever **25*a* and the mode of the brake device 6 is switched to the coupled mode by the controller 4, the operator is waiting while applying the brake operation to the brake operating pedal 7*a* as indicated by the broken line in the graph of FIG. 11. Thus, in the time zone from time t1 to time t2, the controller 4 inputs, to the electromagnetic proportional valve 2, the corresponding pressure command, which is a brake command for adjusting the secondary pressure of the electromagnetic proportional valve 2 to the operation amount corresponding pressure Pv0 corresponding to the operation amount of the brake operation applied to the brake operating pedal 7*a*. This is because when the operator finishes the winding operation and returns the winch operating lever 25*a* to the neutral position, and the controller 4 automatically returns the mode of the brake device 6 from the coupled mode to the free mode, the brake force with the brake operation is immediately applied to the winch drum 11 to avoid free fall of the hook 105 (suspended load 106**) not intended by the operator.

Next, when the winding operation has finished, and the operator returns the winch operating lever **25*a* to the neutral position at time t2 in FIG. 11, the controller 4 automatically returns the mode of the brake device 6** from the coupled mode to the free mode.

However, in a case where the brake operating device 7 adopts the so-called electric pedal system, even though the operator applies the brake operation to the brake operating pedal **7*a* and is waiting in the time zone from time t1 to time t2, when the controller 4 automatically returns the mode of the brake device 6 from the coupled mode to the free mode at time t2, as illustrated in FIG. 11, an undershoot occurs that is a situation in which the pressure in the positive clutch chamber 6*b* of the brake device 6 becomes instantaneously smaller than the operation amount corresponding pressure Pv0**. The reason is as follows.

The electromagnetic proportional valve 2 can maintain an appropriate secondary pressure by balancing the electromagnetic force of the solenoid coil with the spring force and the control circuit pressure (secondary pressure of the electromagnetic proportional valve 2). However, at the time point when the mode of the brake device 6 is switched from the coupled mode to the free mode at time t2, an excessive control circuit pressure (secondary pressure of the electromagnetic proportional valve 2) is generated. Thus, the balance of the electromagnetic force of the solenoid coil with the spring force and the control circuit pressure is not made, the spool of the electromagnetic proportional valve 2 instantaneously moves excessively, and the port on the tank side of the electromagnetic proportional valve 2 is excessively pushed open. As a result, the undershoot as described above occurs. When this undershoot has occurred, the actual brake force on the winch drum 11 instantaneously becomes smaller than the brake force corresponding to the operation amount of the brake operation. The problem to be solved by the winch control device 10 according to the present embodiment is as described above.

When the brake operating device is not an electric pedal system brake operating device but a mechanical link system brake operating device having a structure in which a pedal and a proportional valve are mechanically linked as follows, the problem of undershoot as described above does not occur. Although not illustrated, the operating device includes a brake operating pedal and a proportional valve connected to the brake operating pedal via a mechanism such as a link mechanism. In the case of this mechanical link system, the force for pushing the spool of the proportional valve includes the stepping force from the operator transmitted to the proportional valve via the link mechanism, and thus excessive movement of the spool is less likely to occur.

To solve the above problem, the winch control device 10 according to the present embodiment performs undershoot suppression control including the following first control, second control, and third control. First, when the winding operation is applied to the winch operating lever 25*a* in the free mode, the controller 4 performs the first control of switching the mode of the brake device 6 from the free mode to the coupled mode by controlling the mode switching valve 1. Then, when the winch operating lever 25*a* is returned to the neutral position after the first control, the controller 4 performs the second control of switching the mode of the brake device 6 from the coupled mode to the free mode by controlling the mode switching valve 1 in a state where the set pressure command is input to the electromagnetic proportional valve 2, the set pressure command being a command for adjusting the secondary pressure of the electromagnetic proportional valve 2 to a set pressure Pv1, the set pressure Pv1 being a value larger than the operation amount corresponding pressure Pv0 corresponding to the operation amount of the brake operation. Then, after the second control, the controller 4 performs the third control of inputting the corresponding pressure command to the electromagnetic proportional valve 2, the corresponding pressure command being a command for adjusting the secondary pressure of the electromagnetic proportional valve 2 to the operation amount corresponding pressure Pv0.

In the winch control device 10, when the winch operating lever 25*a* is returned to the neutral position after the first control, the controller 4 switches the mode of the brake device 6 from the coupled mode to the free mode in a state where the set pressure command is input to the electromagnetic proportional valve 2. Thus, the occurrence of the undershoot as described above, that is, the occurrence of a situation in which the pressure in the positive clutch chamber 6*b* of the brake device 6 becomes instantaneously smaller than the operation amount corresponding pressure Pv0 can be suppressed at the time of switching from the coupled mode to the free mode. This can inhibit the actual brake force on the winch drum 11 from becoming instantaneously smaller than the brake force corresponding to the operation amount of the brake operation (operation amount corresponding brake force).

The occurrence of undershoot can be suppressed mainly because of the following reasons. That is, in the present embodiment, the mode of the brake device 6 is switched from the coupled mode to the free mode in a state where the set pressure command is input to the electromagnetic proportional valve 2 instead of the corresponding pressure command (second control). Even though an excessive control circuit pressure (secondary pressure of the electromagnetic proportional valve 2) as described with reference to FIG. 11 is generated at the time when the mode of the brake device 6 is switched from the coupled mode to the free mode, the set pressure command is input to the electromagnetic proportional valve 2 instead of the corresponding pressure command at the time point, and thus the undershoot instantaneously generated at the time point is an undershoot with respect to the set pressure Pv1, not an undershoot with respect to the operation amount corresponding pressure Pv0. Thus, at the time point, a situation in which the pressure in the positive clutch chamber 6*b* of the brake device 6 becomes instantaneously smaller than the operation amount corresponding pressure Pv0 is less likely to occur. Then, after the second control, the controller 4 inputs the corresponding pressure command for lowering the secondary pressure of the electromagnetic proportional valve 2 from the set pressure Pv1 to the operation amount corresponding pressure Pv0 to the electromagnetic proportional valve 2 (third control). In the third control, the controller 4 can adjust the gradient of the pressure change that occurs when the secondary pressure of the electromagnetic proportional valve 2 is lowered from the set pressure Pv1 to the operation amount corresponding pressure Pv0. Thus, the balance of the electromagnetic force of the solenoid coil with the spring force and the control circuit pressure is easily maintained by the controller 4 inputting, to the electromagnetic proportional valve 2, the corresponding pressure command in which the gradient of the pressure change is adjusted so as to suppress excess and instantaneous movement of the spool of the electromagnetic proportional valve 2. As a result, the occurrence of a situation in which the pressure in the positive clutch chamber 6*b* of the brake device 6 becomes instantaneously smaller than the operation amount corresponding pressure Pv0 is suppressed.

Next, the operation of the winch control device 10 according to the present embodiment will be described with reference to FIGS. 3 and 4. FIG. 3 is a graph illustrating undershoot suppression control performed by the controller 4, and FIG. 4 is a flowchart illustrating an example of arithmetic processing of the controller 4.

Figure 4:
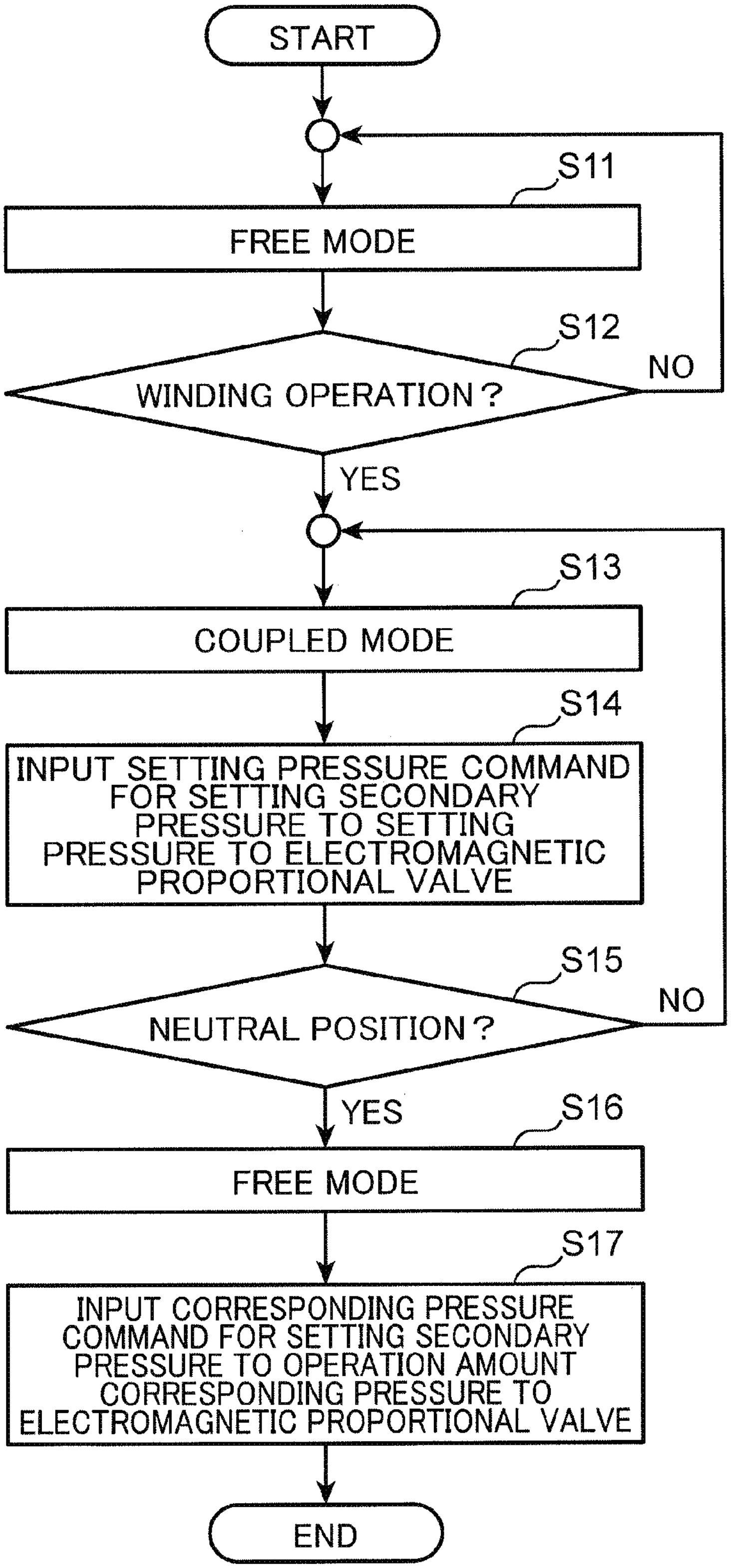
FIG. 4 is a flowchart illustrating an example of arithmetic processing of the controller.

In the time zone before time t1 illustrated in FIG. 3, for example, the mode of the brake device 6 is set to the free mode (step S11 in FIG. 4). The setting of the free mode may be performed, for example, by the operator's free mode operation on the mode selection switch 30, or may be automatically performed by the controller 4 based on a predetermined condition.

In the free mode in the time zone up to time t1 in the graph of FIG. 3, the controller 4 inputs, to the electromagnetic proportional valve 2, the corresponding pressure command, which is a brake command for adjusting the secondary pressure of the electromagnetic proportional valve 2 to the operation amount corresponding pressure Pv0 corresponding to the operation amount (pedal operation amount) of the brake operation applied to the brake operating pedal 7*a*. In other words, the controller 4 sets a secondary pressure target value, which is the target of the secondary pressure of the electromagnetic proportional valve 2, to the operation amount corresponding pressure Pv0 corresponding to the pedal operation amount. With this operation, in the time zone up to time t1, the electromagnetic proportional valve 2 outputs the secondary pressure according to the corresponding pressure command, that is, the operation amount corresponding pressure Pv0 according to the operation amount of the brake operation. As a result, the pressure in the positive clutch chamber 6*b* of the brake device 6 is adjusted to the operation amount corresponding pressure Pv0 as indicated by the solid line in FIG. 3.

Next, when the mode of the brake device 6 is set to the free mode, the controller 4 determines whether the winding operation (winding lever operation) is applied to the winch operating lever 25*a* of the winch operating device 25 (step S12 in FIG. 4). Specifically, the controller 4 determines whether the winding operation is applied to the winch operating lever 25*a* based on the pressure detection signal input from the pressure sensor 5.

When the winding operation (winding lever operation) is applied to the winch operating lever 25*a* (YES in step S12 in FIG. 4), the controller 4 controls the mode switching valve 1 to automatically switch the mode of the brake device 6 from the free mode to the coupled mode (step S13 in FIG. 4, first control). With this operation, since the control pump 22 is connected to the positive clutch chamber 6*b* of the brake device 6 without passing through the electromagnetic proportional valve 2, the pressure in the positive clutch chamber 6*b* is adjusted to a pump pressure Pc which is the secondary pressure of the control pump 22 as indicated by the solid line in FIG. 3 in the time zone from time t1 to time t2 in FIG. 3.

Then, the controller 4 inputs the set pressure command to the electromagnetic proportional valve 2 at the same time as or immediately after switching of the mode of the brake device 6 from the free mode to the coupled mode in the first control (step S14 in FIG. 4). The set pressure command is a command for adjusting the secondary pressure of the electromagnetic proportional valve 2 to the set pressure Pv1, which is a value larger than the operation amount corresponding pressure Pv0 corresponding to the operation amount (pedal operation amount) of the brake operation. That is, in step S14, the controller 4 changes the secondary pressure target value, which is the target of the secondary pressure of the electromagnetic proportional valve 2, to the set pressure Pv1 larger than the operation amount corresponding pressure Pv0. In this manner, in the undershoot suppression control according to the present embodiment, at the same time as the completion of the first control or immediately after the completion of the first control, the controller 4 inputs the set pressure command to the electromagnetic proportional valve 2 as illustrated in FIG. 3 instead of inputting the corresponding pressure command to the electromagnetic proportional valve 2 as illustrated in FIG. 11.

In the present embodiment, since the set pressure command is input to the electromagnetic proportional valve 2 (brake force regulator) at the same time as the completion of the first control or immediately after the completion of the first control, the electromagnetic proportional valve 2 enters a state in which the set pressure command is input at a stage where there is a sufficient time before the second control described later is performed, and can wait in this state. As a result, the actual brake force is more reliably inhibited from becoming smaller than the operation amount corresponding brake force at the time of switching from the coupled mode to the free mode in the second control described later.

In the present embodiment, the set pressure Pv1 is the maximum value of the secondary pressure (maximum secondary pressure) of the electromagnetic proportional valve 2. The maximum secondary pressure is a secondary pressure when the opening degree of the electromagnetic proportional valve 2 is maximum. In the present embodiment, as indicated by the broken line in the time zone from time t1 to time t2 in FIG. 3, the maximum secondary pressure is substantially the same as the pump pressure Pc which is the secondary pressure of the control pump 22.

In the time zone from time t1 to time t2 in the graph of FIG. 3, that is, while the operator is applying the winding operation (winding lever operation) to the winch operating lever 25*a*, and the mode of the brake device 6 is being switched to the coupled mode by the controller 4, the operator is waiting while applying the brake operation to the brake operating pedal 7*a*. The operation amount (pedal operation amount) of the brake operation in the time zone from time t1 to time t2 is the same as the pedal operation amount corresponding to the operation amount corresponding pressure Pv0 indicated by the broken line in the time zone up to time t1.

Next, the controller 4 determines whether the winch operating lever 25*a* has been returned to the neutral position based on the pressure detection signal input from the pressure sensor 5 (step S15 in FIG. 4). When the winch operating lever 25*a* is not returned to the neutral position, and the winding operation is applied to the winch operating lever 25*a* (NO in step S15), the controller 4 repeats the processing of steps S13 to S15.

On the other hand, when the winch operating lever 25*a* is returned to the neutral position, for example, at time t2 (YES in step S15), the controller 4 controls the mode switching valve 1 to automatically switch the mode of the brake device 6 from the coupled mode to the free mode (step S16 in FIG. 4, second control). That is, in the present embodiment, when the winch operating lever 25*a* is returned to the neutral position after the first control, the mode of the brake device 6 is switched from the coupled mode to the free mode in a state where the set pressure command for adjusting the secondary pressure of the electromagnetic proportional valve 2 to the set pressure Pv1 larger than the operation amount corresponding pressure Pv0 is input to the electromagnetic proportional valve 2. When the mode of the brake device 6 is switched to the free mode at time t2 in FIG. 3, the control pump 22 is connected to the positive clutch chamber 6*b* of the brake device 6 via the electromagnetic proportional valve 2. At this time, since the electromagnetic proportional valve 2 is waiting in a state where the set pressure command is input, excessive pushing and opening of the port on the tank side of the electromagnetic proportional valve 2 is suppressed. As a result, the occurrence of undershoot as described above is suppressed.

Next, after the second control, the controller 4 inputs the corresponding pressure command for adjusting the secondary pressure of the electromagnetic proportional valve 2 to the operation amount corresponding pressure Pv0 to the electromagnetic proportional valve 2 (step S17, third control). That is, in step S17, the controller 4 changes the secondary pressure target value, which is the target of the secondary pressure of the electromagnetic proportional valve 2, from the set pressure Pv1 to the operation amount corresponding pressure Pv0.

In the present embodiment, the corresponding pressure command is a command of reducing the secondary pressure of the electromagnetic proportional valve 2 from the set pressure Pv1 to the operation amount corresponding pressure Pv0 over a predetermined time at the degree of decrease of a slope a1 as illustrated in FIG. 3. The secondary pressure of the electromagnetic proportional valve 2 decreases over a predetermined time in this manner, and thus the balance of the electromagnetic force of the solenoid coil with the spring force and the control circuit pressure is easily maintained. As a result, excessive movement of the spool of the electromagnetic proportional valve 2, that is, excessive pushing and opening of the port on the tank side of the electromagnetic proportional valve 2 is suppressed, and the occurrence of the undershoot as described above is further suppressed. As a result, the actual brake force is more effectively inhibited from becoming smaller than the operation amount corresponding brake force at the time of switching from the coupled mode to the free mode.

The corresponding pressure command may be a command of reducing the secondary pressure from the set pressure Pv1 to the operation amount corresponding pressure Pv0 over a predetermined time at the degree of decrease of a slope a2 with which the predetermined time is longer than with the slope a1 as in the first modification of FIG. 5. As a result, the actual brake force is more effectively inhibited from becoming smaller than the operation amount corresponding brake force at the time of switching from the coupled mode to the free mode. Although not illustrated, the corresponding pressure command may be a command of reducing in a staircase pattern the secondary pressure of the electromagnetic proportional valve 2 from the set pressure Pv1 to the operation amount corresponding pressure Pv0.

FIG. 6 is a graph illustrating a second modification of the undershoot suppression control performed by the controller 4. In the second modification illustrated in FIG. 6, the set pressure Pv1 is set to an intermediate value between the operation amount corresponding pressure Pv0 and the maximum value of the secondary pressure of the electromagnetic proportional valve 2. The likelihood of the undershoot also depends on the properties of the electromagnetic proportional valve 2. Thus, in the case of the electromagnetic proportional valve 2 in which the undershoot is likely to occur, it is preferable to increase the difference between the set pressure Pv1 and the operation amount corresponding pressure Pv0 as illustrated in FIG. 3. On the other hand, in the case of the electromagnetic proportional valve 2 in which the undershoot is less likely to occur, the difference between the set pressure Pv1 and the operation amount corresponding pressure Pv0 may be made relatively small as illustrated in FIG. 5.

Figure 8:
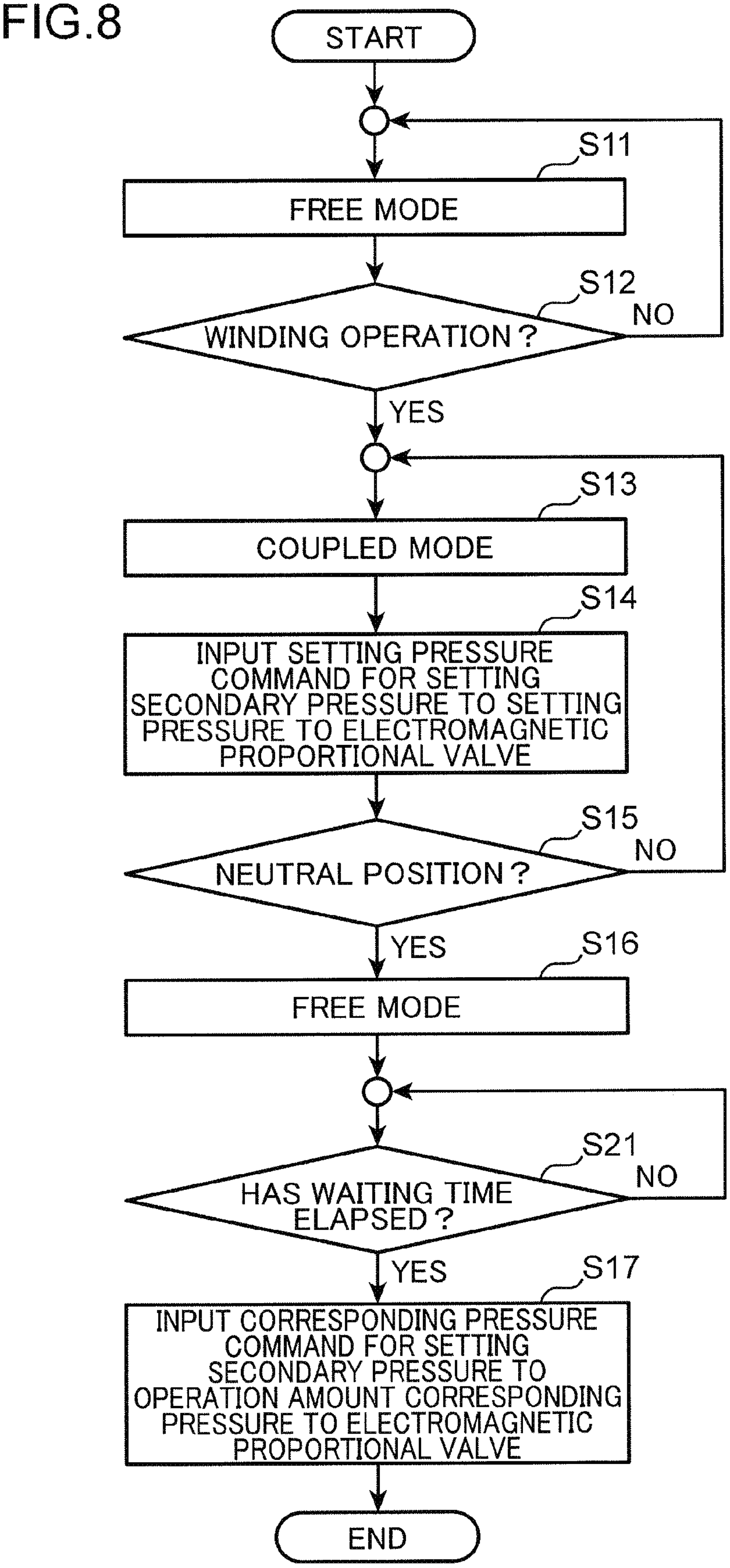
FIG. 8 is a flowchart illustrating an example of arithmetic processing of the controller.

FIG. 7 is a graph illustrating a third modification of the undershoot suppression control performed by the controller 4, and FIG. 8 is a flowchart illustrating an example of arithmetic processing of the controller 4 according to the third modification.

In the third modification, as illustrated in FIG. 7, the controller 4 inputs the corresponding pressure command to the electromagnetic proportional valve 2 in the third control after a preset waiting time Δt has elapsed from the time point (time t2 in FIG. 7) when the free mode switching command for switching the mode of the brake device 6 from the coupled mode to the free mode is input to the mode switching valve 1 in the second control.

In the third modification, since the corresponding pressure command is input to the electromagnetic proportional valve 2 after the waiting time Δt has elapsed (specifically, at time t3) from the time point (time t2) when the free mode switching command is input to the mode switching valve 1, the third control can be avoided from being performed before the mode of the brake device 6 is actually switched to the free mode even when responsiveness of the mode switching valve 1 to the free mode switching command is not so good, that is, even when some time is required from the time point (time t2) when the free mode switching command is input to the mode switching valve 1 until the mode of the brake device 6 is actually switched to the free mode. Thus, the actual brake force is inhibited from becoming smaller than the operation amount corresponding brake force at the time of switching from the coupled mode to the free mode even when the responsiveness of the mode switching valve 1 to the free mode switching command is not so good.

The flowchart of FIG. 8 in the third modification is different from the flowchart illustrated in FIG. 4 in that the flowchart includes the processing of step S21. Steps S11 to S17 in the flowchart of FIG. 8 are the same as steps S11 to S17 in the flowchart of FIG. 4. In the third modification, when the winch operating lever 25*a* is returned to the neutral position at the time t2 (YES in step S15 in FIG. 8), and the free mode switching command is input to the mode switching valve 1 (step S16 in FIG. 8), the controller 4 determines whether a preset waiting time Δt has elapsed from the time when the free mode switching command is input to the mode switching valve 1 (time t2 in FIG. 7) (step S21 in FIG. 8). When the waiting time Δt has elapsed from time t2 (YES in step S21), the controller 4 inputs, to the electromagnetic proportional valve 2, the corresponding pressure command for adjusting the secondary pressure of the electromagnetic proportional valve 2 to the operation amount corresponding pressure Pv0 (step S17, third control).

In the third modification, the corresponding pressure command is a command of reducing the secondary pressure of the electromagnetic proportional valve 2 from the set pressure Pv1 to the operation amount corresponding pressure Pv0 over a predetermined time at the degree of decrease of the slope a1 as illustrated in FIG. 7. The corresponding pressure command may be a command of reducing the secondary pressure from the set pressure Pv1 to the operation amount corresponding pressure Pv0 over a predetermined time at the degree of decrease of the slope a2 with which the predetermined time is longer than with the slope a1 as in a fourth modification of FIG. 9. As a result, the actual brake force is more effectively inhibited from becoming smaller than the operation amount corresponding brake force at the time of switching from the coupled mode to the free mode. Although not illustrated, the corresponding pressure command may be a command of reducing in a staircase pattern the secondary pressure of the electromagnetic proportional valve 2 from the set pressure Pv1 to the operation amount corresponding pressure Pv0.

FIG. 10 is a graph illustrating a fifth modification of the undershoot suppression control performed by the controller 4. In the fifth modification illustrated in FIG. 10, the set pressure Pv1 is set to an intermediate value between the operation amount corresponding pressure Pv0 and the maximum value of the secondary pressure of the electromagnetic proportional valve 2. In the fifth modification, as illustrated in FIG. 10, the controller 4 inputs the corresponding pressure command to the electromagnetic proportional valve 2 at time t3 after a preset waiting time Δt has elapsed from the time point (time t2 in FIG. 10) when the free mode switching command for switching the mode of the brake device 6 from the coupled mode to the free mode is input to the mode switching valve 1 in the second control (third control).

Modifications

The present disclosure is not limited to the embodiment described above. The present disclosure includes, for example, the following modes.

(A) Brake Force Regulator

In the embodiment described above, the brake force regulator is configured by the electromagnetic proportional valve 2, but the brake force regulator in the present disclosure is not limited to the electromagnetic proportional valve

2 as long as it can output the secondary pressure for adjusting the brake force generated by the brake device based on the command of the controller 4 in the free mode.

(B) Mode Switching Valve

In the embodiment described above, the mode switching valve 1 is configured to set the mode of the brake device 6 to the coupled mode when the solenoid is in the non-excited state and to set the mode of the brake device 6 to the free mode when the solenoid is in the excited state, but it may be configured to set the mode of the brake device 6 to the coupled mode when the solenoid is in the excited state and to set the mode of the brake device 6 to the free mode when the solenoid is in the non-excited state.

(C) Timing of Inputting Set Pressure Command

In the embodiment described above, for example, as illustrated in FIGS. 3 and 4, the controller 4 inputs the set pressure command to the electromagnetic proportional valve 2 at the same time as the switching of the mode of the brake device 6 from the free mode to the coupled mode at time t1 or immediately after the switching of the mode of the brake device 6 (step S14 in FIG. 4), but the timing of inputting the set pressure command to the electromagnetic proportional valve 2 does not have to be at the same time as the switching to the coupled mode or immediately after the switching to the coupled mode, but may be, for example, a timing after the winch operating lever 25*a* is returned to the neutral position and before the controller 4 returns the mode of the brake device 6 from the coupled mode to the free mode. Even in this case, in the second control, the controller 4 can switch the mode of the brake device 6 from the coupled mode to the free mode by controlling the mode switching valve 1 in a state where the set pressure command is input to the electromagnetic proportional valve 2.

(D) Winch Operating Device

In the embodiment described above, the winch operating device 25 includes the winch operating lever 25*a* and the remote control valve 25*b*, but it may be a winch operating device of a so-called electric lever system. The winch operating device of the electric lever system includes a winch operating lever 25*a* to which a winch operation by the operator is applied, and a winch operation sensor. The winch operation sensor detects whether the winch operation applied to the winch operating lever 25*a* is the winding operation or the unwinding operation, and detects the operation amount of the winch operation. When the winch operating device is of the electric lever system, the crane 100 further includes a pair of electromagnetic proportional valves (not illustrated). The pair of electromagnetic proportional valves includes an electromagnetic proportional valve corresponding to the winding operation and an electromagnetic proportional valve corresponding to the unwinding operation. The winch operation sensor inputs a detection signal corresponding to the detection result to the controller, and the controller inputs a control command corresponding to the input detection signal to the electromagnetic proportional valve corresponding to the detection result. The electromagnetic proportional valve outputs the secondary pressure (pilot pressure) according to the control command to the winding pilot port 24*a* or the unwinding pilot port 24*b* of the winch control valve 24. With this operation, the winch control valve 24 opens so as to allow the hydraulic oil having the flow amount corresponding to the operation amount of the winch operation to be supplied to the winch motor 23 in the direction corresponding to the winch operation (winding operation or unwinding operation).

When the winch operating device is of an electric lever system, the winding operation detector includes a winch operation sensor. That is, the winch operation sensor inputs a detection signal corresponding to the detection result to the controller 4, and the controller 4 can determine whether the winding operation is applied to the winch operating device 25 based on the detection signal.

(E) Corresponding Pressure Command in Third Control

In the embodiment described above, the corresponding pressure command is a command of reducing the secondary pressure of the electromagnetic proportional valve 2 from the set pressure to the operation amount corresponding pressure over a predetermined time, but the present disclosure is not limited to this configuration. In the third control, the controller 4 may instantaneously change the command to the electromagnetic proportional valve 2 from the set pressure command to the corresponding pressure command.

As described above, according to the present disclosure, it is possible to provide a winch control device capable of inhibiting an actual brake force on a winch drum from becoming instantaneously smaller than a brake force corresponding to an operation amount of a brake operation when a controller automatically returns the mode of a brake device from the coupled mode to the free mode, and a crane including the winch control device.

A winch control device to be provided includes a winch drum around which a rope is wound, a winch motor that drives the winch drum, a winch operating member to which a winding operation for rotating the winch drum in a rope winding direction is applied, a brake operating member to which a brake operation is applied, a brake device capable of generating a brake force on the winch drum, a mode switching valve that switches a mode of the brake device between a coupled mode in which a drive force of the winch motor is capable of being transmitted to the winch drum and a free mode in which the rope is capable of being unwound from the winch drum by a tension of the rope, a brake force regulator that outputs a secondary pressure for adjusting the brake force in the free mode, and a controller, wherein the controller performs a first control of switching the mode of the brake device from the free mode to the coupled mode by controlling the mode switching valve when the winding operation is applied to the winch operating member in the free mode, a second control of switching the mode of the brake device from the coupled mode to the free mode by controlling the mode switching valve in a state where a set pressure command for adjusting the secondary pressure of the brake force regulator to a set pressure that is a value larger than an operation amount corresponding pressure corresponding to an operation amount of the brake operation is input to the brake force regulator when the winch operating member is returned to a neutral position after the first control, and a third control of inputting a corresponding pressure command for adjusting the secondary pressure of the brake force regulator to the operation amount corresponding pressure to the brake force regulator after the second control.

In the winch control device, when the winch operating member is returned to the neutral position after the first control, the controller switches the mode of the brake device from the coupled mode to the free mode in a state where the set pressure command is input to the brake regulator. Thus, it is possible to inhibit the actual brake force on the winch drum from becoming instantaneously smaller than the brake force corresponding to the operation amount of the brake operation (operation amount corresponding brake force) at the time of switching from the coupled mode to the free mode.

The corresponding pressure command is preferably a command of reducing the secondary pressure of the brake force regulator from the set pressure to the operation amount corresponding pressure over a predetermined time. In this configuration, the secondary pressure of the brake force regulator decreases from the set pressure to the operation amount corresponding pressure over a predetermined time. Thus, the actual brake force can be more effectively inhibited from becoming smaller than the operation amount corresponding brake force at the time of switching from the coupled mode to the free mode.

The corresponding pressure command may be a command of reducing in a staircase pattern the secondary pressure of the brake force regulator from the set pressure to the operation amount corresponding pressure. In this configuration, the secondary pressure of the brake force regulator decreases in a staircase pattern from the set pressure to the operation amount corresponding pressure. Thus, the actual brake force can be more effectively inhibited from becoming smaller than the operation amount corresponding brake force at the time of switching from the coupled mode to the free mode.

The controller preferably inputs the corresponding pressure command to the brake force regulator in the third control after a preset waiting time has elapsed from a time point when a free mode switching command for switching the mode of the brake device from the coupled mode to the free mode is input to the mode switching valve in the second control. In this configuration, the corresponding pressure command is input to the brake force regulator after the waiting time has elapsed from the time point when the free mode switching command is input to the mode switching valve. Thus, the third control can be avoided from being performed before the mode of the brake device is actually switched to the free mode even when responsiveness of the mode switching valve to the free mode switching command is not so good, that is, even when some time is required from the time point when the free mode switching command is input to the mode switching valve until the mode of the brake device is actually switched to the free mode. Thus, the actual brake force is inhibited from becoming smaller than the operation amount corresponding brake force at the time of switching from the coupled mode to the free mode even when the responsiveness of the mode switching valve to the free mode switching command is not so good.

The controller preferably inputs the set pressure command to the brake force regulator at the same time as or immediately after switching of the mode of the brake device from the free mode to the coupled mode in the first control. In this configuration, since the set pressure command is input to the brake force regulator at the same time as the completion of the first control or immediately after the completion of the first control, the brake force regulator enters a state where the set pressure command is input at a stage where there is a sufficient time before the second control is performed, and can wait in this state. As a result, the actual brake force is more reliably inhibited from becoming smaller than the operation amount corresponding brake force at the time of switching from the coupled mode to the free mode.

The set pressure may be a maximum value of the secondary pressure of the brake force regulator.

The set pressure may be an intermediate value between the operation amount corresponding pressure and a maximum value of the secondary pressure of the brake force regulator.

A crane to be provided includes a machine body, a work device attached to the machine body, and the winch control device described above. In this crane, at the time of switching from the coupled mode to the free mode, it is possible to inhibit the actual brake force on the winch drum from becoming instantaneously smaller than the operation amount corresponding brake force.

The invention claimed is:

1. A winch control device comprising:
- a winch drum around which a rope is wound;
- a winch motor that drives the winch drum;
- a winch operating member to which a winding operation for rotating the winch drum in a rope winding direction is applied;
- a brake operating member to which a brake operation is applied;
- a brake device capable of generating a brake force on the winch drum;
- a mode switching valve that switches a mode of the brake device between a coupled mode in which a drive force of the winch motor is capable of being transmitted to the winch drum and a free mode in which the rope is capable of being unwound from the winch drum by a tension of the rope;
- a brake force regulator that outputs a secondary pressure for adjusting the brake force in the free mode; and
- a controller,
- wherein the controller performs a first control of switching the mode of the brake device from the free mode to the coupled mode by controlling the mode switching valve when the winding operation is applied to the winch operating member in the free mode, a second control of switching the mode of the brake device from the coupled mode to the free mode by controlling the mode switching valve in a state where a set pressure command for adjusting the secondary pressure of the brake force regulator to a set pressure that is a value larger than an operation amount corresponding pressure corresponding to an operation amount of the brake operation is input to the brake force regulator when the winch operating member is returned to a neutral position after the first control, and a third control of inputting a corresponding pressure command for adjusting the secondary pressure of the brake force regulator to the operation amount corresponding pressure to the brake force regulator after the second control.

2. The winch control device according to claim 1, wherein the corresponding pressure command is a command of reducing the secondary pressure of the brake force regulator from the set pressure to the operation amount corresponding pressure over a predetermined time.

3. The winch control device according to claim 1, wherein the corresponding pressure command is a command of reducing in a staircase pattern the secondary pressure of the brake force regulator from the set pressure to the operation amount corresponding pressure.

4. The winch control device according to claim 1, wherein the controller inputs the corresponding pressure command to the brake force regulator in the third control after a preset waiting time has elapsed from a time point when a free mode switching command for switching the mode of the brake device from the coupled mode to the free mode is input to the mode switching valve in the second control.

5. The winch control device according to claim 1, wherein the controller inputs the set pressure command to the brake force regulator at the same time as or immediately after switching of the mode of the brake device from the free mode to the coupled mode in the first control.

6. The winch control device according to claim 1, wherein the set pressure is a maximum value of the secondary pressure of the brake force regulator.

7. The winch control device according to claim 1, wherein the set pressure is an intermediate value between the operation amount corresponding pressure and a maximum value of the secondary pressure of the brake force regulator.

8. A crane comprising:

a machine body;

a work device attached to the machine body; and the winch control device according to claim 1.

* * * * *